(No Model.)

C. T. BOYER.
BUNCHING ATTACHMENT FOR MOWING MACHINES.

No. 558,032. Patented Apr. 14, 1896.

WITNESSES:

INVENTOR

Charles T. Boyer,
BY Chester Bradford,
ATTORNEY.

UNITED STATES PATENT OFFICE.

CHARLES T. BOYER, OF INDIANAPOLIS, INDIANA, ASSIGNOR TO THE AMERICAN BUNCHER MANUFACTURING COMPANY, OF SAME PLACE.

BUNCHING ATTACHMENT FOR MOWING-MACHINES.

SPECIFICATION forming part of Letters Patent No. 558,032, dated April 14, 1896.

Application filed July 31, 1895. Serial No. 557,730. (No model.)

*To all whom it may concern:*

Be it known that I, CHARLES T. BOYER, a citizen of the United States, residing at Indianapolis, in the county of Marion and State of Indiana, have invented certain new and useful Improvements in Bunching Attachments for Mowing-Machines, of which the following is a specification.

The object of my said invention is to provide a convenient and efficient means whereby hay or grass in being cut can be deposited in bunches over the field as it comes from the mowing-machine instead of being distributed thinly over said surface, as is commonly done by the use of ordinary mowers not having a special attachment. To so bunch the grass is especially desirable in cutting clover, where it is an object to save the seed, in which case, as is well known, the clover should be left in bunches and subject to the action of the weather for a time, during which period it should be disturbed as little as possible.

My present invention consists in an improved attachment whereby the above-stated object is accomplished, as will be hereinafter more particularly described and claimed.

One principal feature of my invention consists in a construction whereby the friction of the stubble extending up between the bars or slats of the bunching-attachment structure is enabled to force the hay or grass, as it is cut, back against the stop devices. As will be noticed upon an examination of the drawings, these bars or slats are attached to the frame of the bunching attachment only at the forward end, and the rear ends of said bars or slats are free and disconnected, leaving clear spaces from near the front end of said bunching attachments back entirely through the whole length thereof, and the stubble extending up into these free spaces comes in contact with and actuates the thin film of hay or grass as it falls onto said bars or slats and forces it back into a comparatively solid bunch against the stopping devices.

Figure 1:
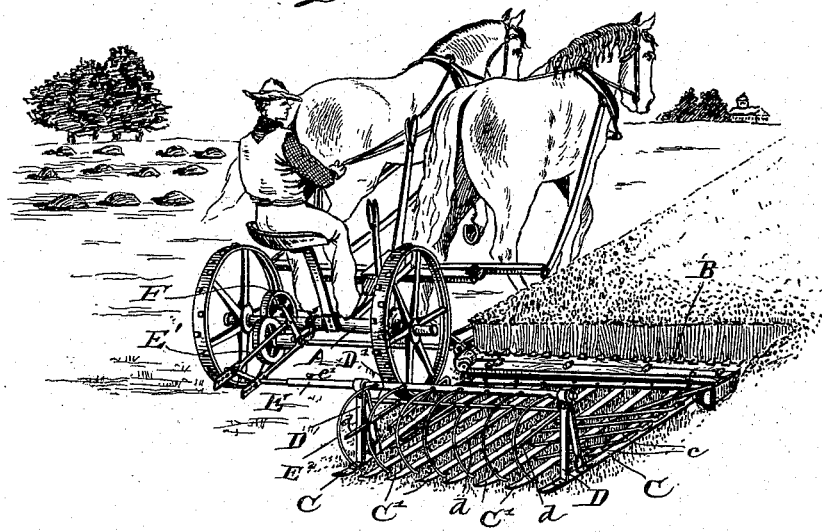
Figure 2:
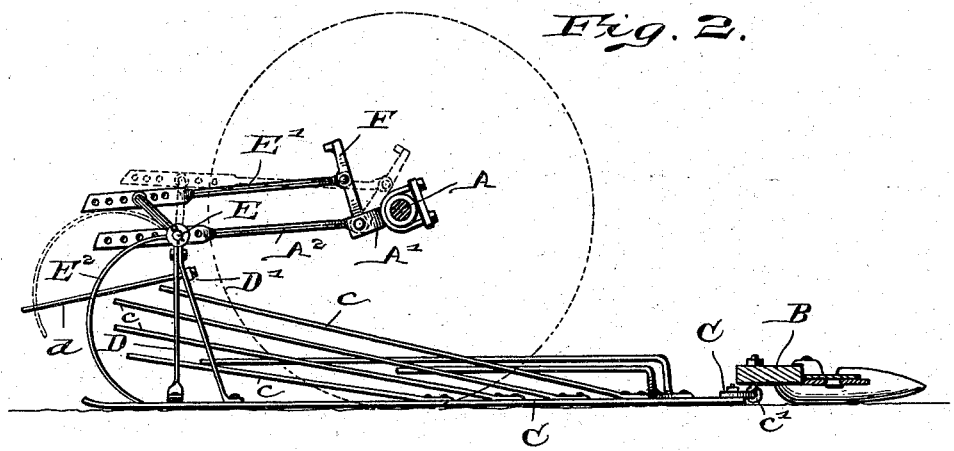

Referring to the accompanying drawings, which are made a part hereof, and on which similar letters of reference indicate similar parts, Figure 1 is a perspective view illustrating a mowing-machine in use, which is provided with an attachment embodying my said invention; Fig. 2, an end elevation of said attachment, the position of the wheel of the mowing-machine relative thereto being indicated by dotted lines; and Fig. 3, a detail sectional view of the rock-shaft forming part of said attachment.

In said drawings, the portions marked A represent the axle of the mowing-machine; B, the finger-bar thereto; C, the main frame of my said attachment; D, standards on said frame C; E, a rock-shaft mounted in bearings in the upper ends of said standards, and F a treadle by which said rock-shaft may be operated.

The mowing-machine as a whole, including the axle A and finger-bar B, is or may be of any ordinary or desired construction and needs no special description.

It may be here stated that my attachment is intended for use with, and adapted to be applied to, any ordinary form of mowing-machine.

The frame or platform C consists of one main bar running directly across the path of the mowing-machine behind and below the finger-bar B, and two other bars connected thereto and running preferably in a converging direction toward the rear, the latter of which carry and support the standards D. The outer one of these bars also carries the guards c, by which the grass in being cut is prevented from falling off the outer end of the attachment or coming in contact with the standing grass alongside of it. To the front or main cross-bars of this frame are also connected several bars or rods C', which extend rearwardly parallel with each other and between the side bars of the frame C, and form the bottom of the attachment onto which the grass as it is cut will fall. These rods or bars are preferably curved upwardly somewhat at the rear end and are near enough together so that no grass shall escape through them, and at the same time are far enough apart so that the stubble will project up between them and draw the grass, as it is cut, back against the rods or teeth on the rock-shaft E. The structure may be briefly designated as a "slatted platform."

The standards D are rigidly attached to the rearwardly-extending bars of the frame C, at a point near the rear ends thereof, and extend up a sufficient distance so that they will, when the machine is in operation, rise above the bunches of grass being cut. In the upper ends of these standards are the bearings for the rock-shaft E. There is also secured to these standards a cross-bar D', and from said cross-bar extend out (preferably on a downward inclination) the bars or fingers $d$. When the shaft E is rocked and the stop-teeth $E^2$ raised, these fingers $d$ prevent the grass from being raised with them, but said grass is by said fingers certainly caused to be discharged at the point desired.

Figure 3:

The rock-shaft E is mounted in the bearings in the standards D, and has a crank $e$ on its inner end, by which, through the link or connecting-rod E', it is operated from the treadle F. Attached thereto are a series of curved rods or teeth $E^2$, which in the present construction constitute the stops, and which are normally in the position shown in Fig. 1 and by the full lines in Fig. 2, where they receive, stop, and hold the grass on the bars C', as it falls on said bars after being cut, until bunches of the desired size are formed, but are capable of being operated to the position shown by the dotted lines in Fig. 2, so as to discharge the bunches. These teeth, although their function is different, are constructed and raised and lowered substantially as are the well-known horse-rake teeth, and therefore need not be further described. The points of said stop teeth or fingers when in their lowermost position are just within or forward of the points of the bars C', so that no space exists between them over which the teeth may act as rake-teeth, and thereby avoid collecting trash from the ground. The rock-shaft E is preferably constructed in two parts which are telescopic in relation to each other, as is best shown in Fig. 3, where the part bearing the crank $e$ is shown as entering a longitudinal perforation in the other part, where it is secured by a set-screw $e'$. This is so that any desired point of attachment to the axle may be had and the device as a whole secured to any desired form of mowing-machine.

The treadle F is mounted in a shackle or bearing A' secured to some convenient portion of the mower-frame, (preferably the axle A,) and is adapted to be operated, as indicated by the dotted lines in Fig. 2, to rock the shaft E and force the fingers or teeth $E^2$ thereon from one position to the other. Commonly, in operation, the driver permits his heel to rest against this treadle while the bunch is being formed, so as to prevent any accidental discharge, and then, when a bunch of sufficient size has been formed, forces the treadle forward, thus discharging said bunch. A stay-bar $A^2$ extends back from the shackle A' to the rock-shaft E, and this receives the strain of the back-and-forth movements of the treadle F instead of subjecting said rock-shaft directly to such strain, thus securing comparative rigidity for said shaft at the operating-point. The link or connecting-rod E' and stay-bar $A^2$, as will be noticed, are both provided with numerous perforations, so that any required adjustment can be made in attaching my apparatus to the mower, and thus said attachment or apparatus as primarily constructed is adapted, without change, to be attached to and used with a large variety of mowing-machines, the only fitting necessary being to make the required perforations for the eyebolts $c'$ in the finger-bar B, as the shackles A' are adapted to be secured, without fitting, directly to any mower axle or frame, as will be readily understood, and the comparative distance rearwardly from the axle and the finger-bar being readily provided for by the several perforations in the rods E' and $A^2$, while any desired position on the axle longitudinally can be secured by the telescopic construction of the rock-shaft E.

Having thus fully described my said invention, what I claim as new, and desire to secure by Letters Patent, is—

1. The combination, with a mowing-machine, of a bunching attachment secured under and in the rear of the finger-bar and consisting of a suitable slatted platform whose rods or bars run loosely rearwardly from a point immediately at the rear of said finger-bar, standards on the rear portion of the frame thereof, a rock-shaft mounted in bearings in the upper ends of said standards and provided with stop-fingers extending down to the ground and with a crank upon the inner end, a treadle connected to the frame or axle of the mowing-machine, and a connecting-rod running from said crank to said treadle, whereby bunches of grass may be first accumulated, as the mowing proceeds, and discharged at the will of the mowing-machine operator, substantially as shown and described.

2. The combination, with a mowing-machine, of a bunching attachment therefor consisting of a platform secured at the rear of the finger-bar, a rock-shaft carrying stop-fingers mounted in said framework, a treadle attached to the frame or axle of the mowing-machine and connected to the crank on said rock-shaft, an adjustable link or connecting-rod between said treadle and said rock-shaft, said rock-shaft being formed in two parts telescopic relatively to each other, whereby the attachment may be adjusted in either or both directions, substantially as and for the purposes set forth.

3. The combination, with a mowing-machine, of a bunching attachment therefor consisting principally of a framework secured in the rear of the finger-bar, standards on said framework, a rock-shaft carrying stop-fingers mounted on said standards, and a fixed cross-bar also on said standards with rearwardly-projecting fingers extending out between and alongside the stop-fingers, whereby the bunches are prevented from being raised with said teeth, substantially as shown and described.

In witness whereof I have hereunto set my hand and seal, at Indianapolis, Indiana, this 26th day of July, A. D. 1895.

CHARLES T. BOYER. [L. S.]

Witnesses:
CHESTER BRADFORD,
JAMES A. WALSH.